United States Patent
Drexler et al.

(10) Patent No.: US 11,007,764 B2
(45) Date of Patent: *May 18, 2021

(54) METHODS AND APPARATUS TO FORM VENTING PATHWAYS IN PRESSURE SENSITIVE ADHESIVES FOR LAMINATE STACKS

(71) Applicant: The Boeing Company, Chicago, IL (US)

(72) Inventors: Jason W. Drexler, Brier, WA (US); John Christopher Wilde, Mill Creek, WA (US); Xiaoxi Wang, Mukilteo, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/659,101

(22) Filed: Oct. 21, 2019

(65) Prior Publication Data

US 2020/0047477 A1 Feb. 13, 2020

Related U.S. Application Data

(63) Continuation of application No. 15/397,460, filed on Jan. 3, 2017, now Pat. No. 10,507,635.

(51) Int. Cl.
*B32B 37/12* (2006.01)
*B29C 63/02* (2006.01)
(Continued)

(52) U.S. Cl.
CPC .......... *B32B 37/12* (2013.01); *B29C 63/0017* (2013.01); *B29C 63/0047* (2013.01);
(Continued)

(58) Field of Classification Search
CPC ....... B32B 37/12; B32B 37/003; B32B 5/022; B32B 2419/00; B32B 2605/00;
(Continued)

(56) References Cited

U.S. PATENT DOCUMENTS

| 5,607,763 A | 3/1997 | Matsuda |
| 6,015,606 A | 1/2000 | Abe |

(Continued)

FOREIGN PATENT DOCUMENTS

| CN | 101959677 | 1/2011 |
| EP | 3342591 | 7/2018 |

OTHER PUBLICATIONS

European Patent Office, "Communication pursuant to Article 94(3) EPC," issued in connection with European Patent Application No. 19207936.6, dated Oct. 8, 2020, 8 pages.

(Continued)

*Primary Examiner* — Christopher T Schatz
*Assistant Examiner* — Cynthia L Schaller
(74) *Attorney, Agent, or Firm* — Hanley, Flight & Zimmerman, LLC

(57) ABSTRACT

Methods and apparatus to form venting pathways in pressure sensitive adhesives for laminate stacks are disclosed. An example method includes forming a laminate stack including a gas permeable nonwoven layer and a pressure sensitive adhesive layer. The pressure sensitive adhesive layer has a first surface and a second surface located opposite the first surface. The first surface contacts the gas permeable nonwoven layer. The method further includes processing the laminate stack by reducing a ductility of the pressure sensitive adhesive layer such that venting pathways are formed in the pressure sensitive adhesive layer in response to a mechanical strain applied to the pressure sensitive adhesive layer via a trapped gas. The venting pathways extend
(Continued)

through a thickness of the pressure sensitive adhesive layer to enable the trapped gas to pass through the pressure sensitive adhesive layer from the second surface to the first surface.

20 Claims, 9 Drawing Sheets

(51) Int. Cl.
    *B32B 37/00*     (2006.01)
    *C09J 7/38*     (2018.01)
    *B29C 63/00*     (2006.01)
    *C09J 7/21*     (2018.01)
    *B32B 5/02*     (2006.01)
    *B44C 5/04*     (2006.01)
    *B32B 37/06*     (2006.01)
    *B32B 37/10*     (2006.01)

(52) U.S. Cl.
    CPC .............. *B29C 63/02* (2013.01); *B32B 5/022* (2013.01); *B32B 37/003* (2013.01); *C09J 7/21* (2018.01); *C09J 7/38* (2018.01); *B29K 2995/0065* (2013.01); *B32B 37/0053* (2013.01); *B32B 37/06* (2013.01); *B32B 37/10* (2013.01); *B32B 2310/0831* (2013.01); *B32B 2419/00* (2013.01); *B32B 2605/00* (2013.01); *B44C 5/04* (2013.01); *C09J 2400/263* (2013.01)

(58) Field of Classification Search
    CPC ..... B32B 37/0053; B32B 37/06; B32B 37/10; B32B 2310/0831; B32B 27/08; B32B 27/12; B32B 5/26; B32B 2307/724; B32B 2255/10; B32B 2451/00; B32B 2260/048; B32B 2307/412; B32B 2260/021; B32B 2590/00; B32B 2262/0276; B32B 2307/41; B32B 2605/18; B32B 2519/00; B32B 2405/00; B32B 2307/4023; B32B 2260/046; B32B 2398/20; B32B 2398/10; B29C 63/02; B29C 63/0047; B29C 63/0017; C09J 7/38; C09J 7/21; C09J 2400/263; C09J 2301/122; C09J 2301/302; B44C 5/04; B29K 2995/0065
See application file for complete search history.

(56) References Cited

U.S. PATENT DOCUMENTS

| | | | |
|---|---|---|---|
| 6,294,250 | B1 | 9/2001 | Date |
| 9,375,904 | B2 | 6/2016 | Jokisch et al. |
| 2006/0083894 | A1 | 4/2006 | Vetrovec et al. |
| 2007/0166501 | A1 | 7/2007 | Seitz et al. |
| 2010/0316834 | A1 | 12/2010 | Jokisch et al. |
| 2014/0363651 | A1 | 12/2014 | Lu et al. |
| 2015/0290913 | A1 | 10/2015 | Hohberg |
| 2015/0298446 | A1 | 10/2015 | Mikami et al. |
| 2016/0250828 | A1 | 9/2016 | Wilde et al. |
| 2017/0326820 | A1 | 11/2017 | Fujioka et al. |

OTHER PUBLICATIONS

European Patent Office, "Extended European Search Report," issued in connection with European Patent Application No. 17209785.9, dated Jul. 23, 2018, 14 pages.

Perm Inc, TIPM Laboratory, "Permeability: Measurement of Permeability," dated Nov. 11, 2016, retrieved from [https://web.archive.org/web/20161111053443/http://perminc.com/resources/fundamentals-of-fluid-flow-in-porous-media/chapter-2-the-porous-medium/permeability/measurement-permeability/] on May 8, 2018, 6 pages.

European Patent Office, "Partial European search report," issued in connection with European Patent Application No. 17209785.9, dated May 17, 2018, 16 pages.

United States Patent and Trademark Office, "Non-Final Office Action," issued in connection with U.S. Appl. No. 15/397,460, dated Apr. 26, 2019, 48 pages.

United States Patent and Trademark Office, "Notice of Allowance and Fee(s) Due," issued in connection with U.S. Appl. No. 15/397,460, dated Aug. 21, 2019, 24 pages.

European Patent Office, "Extended European Search Report," issued in connection with European Patent Application No. 19207936.6, dated Feb. 6, 2020, 11 pages.

Perm Inc., "Permeability: Measurement of Permeability," dated Nov. 11, 2016, retrieved from [https://web.archive.org/web/20161111053443/http://perminc.com/resources/fundamentals-of-fluid-flow-in-porous-media/chapter-2-the-porous-medium/permeability/measurement-permeability/] on May 8, 2018, 8 pages.

State Intellectual Property Office of China, "Notification of First Office Action," issued in connection with European Patent Application No. 201810000948.5, dated Jan. 21, 2021, 26 pages.

METHODS AND APPARATUS TO FORM VENTING PATHWAYS IN PRESSURE SENSITIVE ADHESIVES FOR LAMINATE STACKS

RELATED APPLICATIONS

This application arises from a continuation of U.S. patent application Ser. No. 15/397,460, filed Jan. 3, 2017, entitled "Methods and Apparatus to Form Venting Pathways in Pressure Sensitive Adhesives for Laminate Stacks." The entirety of U.S. patent application Ser. No. 15/397,460 is hereby incorporated herein by reference.

FIELD OF THE DISCLOSURE

This patent relates generally to decorative laminates and, more particularly, to methods and apparatus to form venting pathways in pressure sensitive adhesives for laminate stacks.

BACKGROUND

Vehicles (e.g., mass transit vehicles, tractor-trailers, personal automobiles, etc.), buildings and/or other structures (e.g., billboards) include surfaces that are visible to people. These surfaces often include decorative images for aesthetic, informational and/or advertising purposes. For example, some interior surfaces of aircraft and/or other mass transit vehicles (e.g., buses, trains, ships, etc.) include decorative images that identify the mass transit provider (e.g., an airline carrier) and/or advertise for another entity, product or service. In some instances, the decorative images are formed by a decorative laminate that is coupled to a surface of the vehicle, building and/or other structure.

Many industries, such as the aerospace, automotive, and rail-transport industries, continually seek to push the boundaries of what has come before in decorative laminates and methods of manufacturing laminate systems. Thus, there is a need for improved decorative laminates, laminate systems, and methods of manufacturing decorative laminates and laminate systems.

SUMMARY

An example method includes forming a laminate stack including a gas permeable nonwoven layer and a pressure sensitive adhesive layer. The pressure sensitive adhesive layer has a first surface and a second surface located opposite the first surface. The first surface contacts the gas permeable nonwoven layer. The example method further includes processing the laminate stack by reducing a ductility of the pressure sensitive adhesive layer such that venting pathways are formed in the pressure sensitive adhesive layer in response to a mechanical strain applied to the pressure sensitive adhesive layer via a trapped gas. The venting pathways extend through a thickness of the pressure sensitive adhesive layer to enable the trapped gas to pass through the pressure sensitive adhesive layer from the second surface to the first surface.

An example apparatus includes a laminate stack for a decorative laminate. The laminate stack includes a gas permeable nonwoven layer and a pressure sensitive adhesive layer. The pressure sensitive adhesive layer has a first surface and a second surface located opposite the first surface. The first surface contacts the gas permeable nonwoven layer. The laminate stack is configured such that venting pathways are formed in the pressure sensitive adhesive layer in response to a mechanical strain applied to the pressure sensitive adhesive layer via a trapped gas. The venting pathways extend through a thickness of the pressure sensitive adhesive layer to enable the trapped gas to pass through the pressure sensitive adhesive layer from the second surface to the first surface.

An example method includes applying a decorative laminate to a panel surface. The decorative laminate includes a gas permeable nonwoven layer and a pressure sensitive adhesive layer. The pressure sensitive adhesive layer has a first surface and a second surface located opposite the first surface. The first surface contacts the gas permeable nonwoven layer. The second surface contacts the panel surface in response to the decorative laminate being applied to the panel surface. The example method further includes trapping gas between the second surface of the pressure sensitive adhesive layer and the panel surface. The example method further includes forming venting pathways in the pressure sensitive adhesive layer in response to a mechanical strain applied to the pressure sensitive adhesive layer via the trapped gas. The venting pathways extend through a thickness of the pressure sensitive adhesive layer to enable the trapped gas to pass through the pressure sensitive adhesive layer from the second surface to the first surface.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
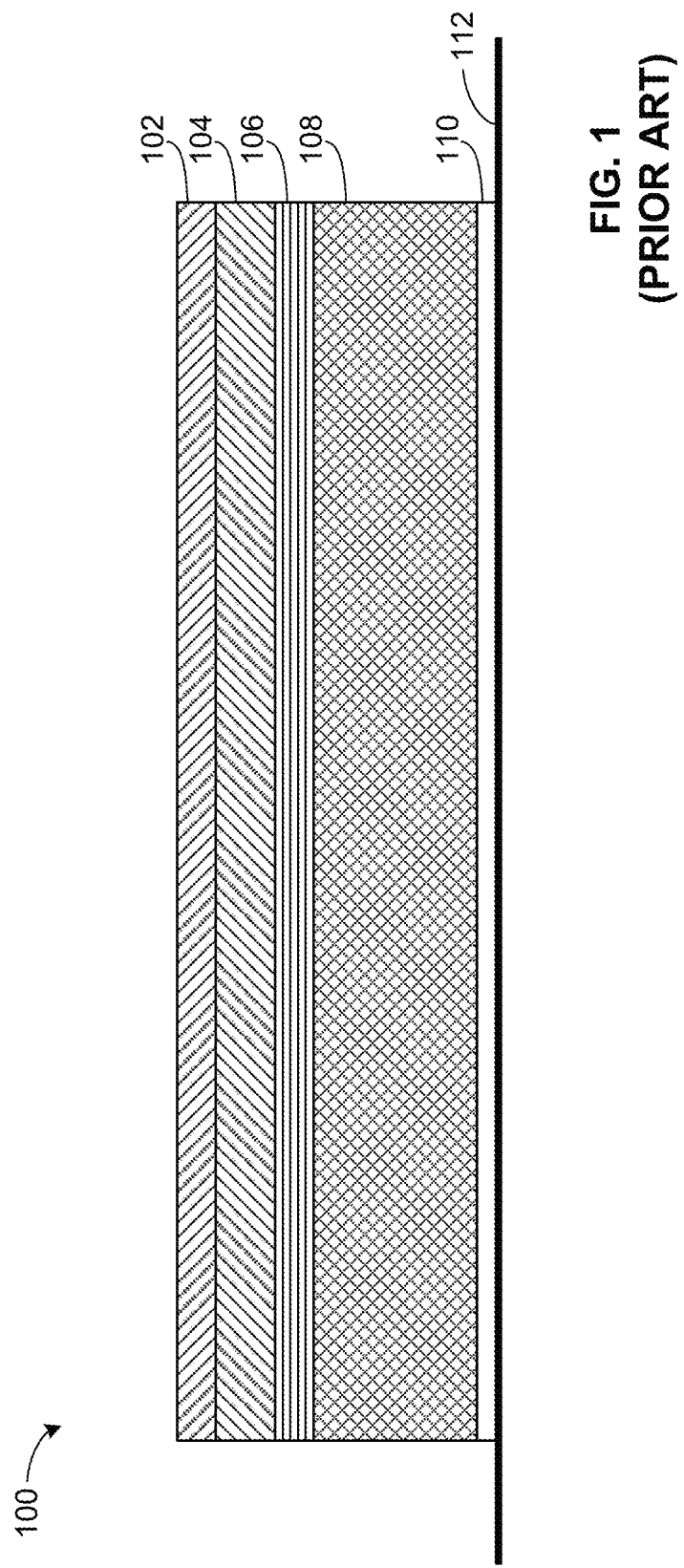
FIG. 1 depicts a known decorative laminate.

Surfaces in public spaces (e.g., billboards, building walls, vehicle panels, etc.) oftentimes include decorative images for aesthetic, informational, and/or advertising purposes.

Some known aircraft and/or other mass transit vehicles (e.g., buses, trains, ships, etc.) include decorative images (e.g., a decorative pattern, words, a logo, etc.) on their surfaces for aesthetic, informational and/or advertising purposes. For example, interior surfaces of mass transit vehicles may include decorative images that identify the mass transit provider (e.g., an airline carrier) and/or advertise for another entity, product or service. In some examples, the decorative images are formed by a decorative laminate that is coupled to the interior surface of the vehicle.

Many known decorative laminates include a plurality of layers. For example, some known decorative laminates include a top sheet layer, an embossing resin layer, a barrier/opacity layer, and a nonwoven permeable layer, which together form a laminate stack. In some examples, the laminate stack also includes an adhesive layer to adhere the laminate stack to a surface of, for example, an aircraft. Gases (e.g., air) can be trapped under the adhesive layer during application of the laminate stack to the surface, which may create bubbles and/or imperfections in the decorative laminate. The bubbles and/or imperfections can distort the image(s) and/or lettering on the decorative laminate. Some methods to prevent gas from being trapped between the adhesive layer and the surface include forming channels in the adhesive layer or including porous additives in the adhesive during manufacture. However, the channels may collapse when the adhesive is applied to the surface and the porous additives can reduce the bond strength of the adhesive and/or leave marks on the surface.

Example laminate stacks for a decorative laminate described herein include a pressure sensitive adhesive layer having an intrinsic permeability to enable a predetermined rate of passage (e.g., permeation) of gas through the pressure sensitive adhesive layer. As used herein, the term "intrinsic permeability" generally refers to a relative ease with which a porous medium can transmit or pass a fluid. More specifically, the term "intrinsic permeability" refers to a fluid transmission property of a porous medium that is independent of the nature of the fluid (e.g., a gas, air) that passes through the porous medium and the dimensions of the porous medium. In the examples described herein, the pressure sensitive adhesive layer maintains the continuity and bond strength of the adhesive while allowing trapped gasses to pass (e.g., permeate) through the pressure sensitive adhesive layer. The pressure sensitive adhesive layer may be used with a permeable decorative laminate stack that enables trapped gas to pass through the other layers of the laminate stack as well as the pressure sensitive adhesive layer. As described in greater detail in connection with the examples herein, the pressure sensitive adhesive layer includes venting pathways having a size (e.g., a diameter) of at least 50 nanometers to about 1 millimeter to provide an intrinsic permeability of at least $1 \times 10^{-13}$ cm$^2$ to about $1 \times 10^{-6}$ cm$^2$ in a processed pressure sensitive adhesive layer that is applied to a surface.

The pressure sensitive adhesive layer may include a plurality of venting pathways to enable the passage (e.g., permeation) of gas through the pressure sensitive adhesive layer. The venting pathways are formed by interconnected voids created (i.e., separate voids joined by void nucleation) in the layer due to mechanical strain on the pressure sensitive adhesive layer. More specifically, voids are formed in the pressure sensitive adhesive layer as a result of a change in properties of the pressure sensitive adhesive layer during manufacture of a laminate stack to which the pressure sensitive adhesive layer is coupled and/or due to strain experienced by the pressure sensitive adhesive layer during application of the laminate stack to a surface (e.g., as a result of gas being trapped between the adhesive layer and a surface to which the adhesive layer is coupled). In any case, the voids formed in the pressure sensitive adhesive layer are sufficiently numerous and distributed in the body of the adhesive layer such that at least some of the voids interconnect to provide passages or pathways that enable gas to pass through the thickness of the pressure sensitive adhesive layer. As such, these passages or pathways may function as venting pathways to enable any gas trapped between, for example, the pressure sensitive adhesive layer and a surface to which the pressure sensitive adhesive layer is coupled to pass through the pressure sensitive adhesive layer. In this manner, any such trapped gas can readily pass through the pressure sensitive adhesive layer as well the remaining permeable layers of any laminate stack coupled to the pressure sensitive adhesive layer, thereby preventing the formation of bubbles in the laminate stack.

As described in greater detail below, the voids and, thus, venting pathways, may form such that the venting pathways extend randomly through the thickness and across at least a portion of the width and length of (e.g., in three dimensions through the volume or body of) the pressure sensitive adhesive layer. As such, the venting pathways may be tortuous pathways that extend in a relatively random manner through the thickness of the pressure sensitive adhesive layer. In some examples, the voids and, thus, venting pathways may only form in a volume of the pressure sensitive adhesive layer that is relatively local to trapped gas that caused a localized increase in stress in the pressure sensitive adhesive layer. In other examples, the voids and, thus, the venting pathways may form substantially throughout the volume of the pressure sensitive adhesive layer. In still other examples, the voids may form in a less random fashion (e.g., in accordance with a pattern) to provide the venting pathways.

The example laminate stacks described herein may be subjected to a combination of pressure and heat during processing and/or manufacture of the laminate stacks to bond the pressure sensitive adhesive layer to a gas permeable nonwoven layer. The combination of pressure and heat cures the pressure sensitive adhesive layer such that venting pathways are formed in the pressure sensitive adhesive layer during use (e.g., application to a panel) when the pressure sensitive adhesive layer experiences strain due to, for example, gas trapped between the surface and the pressure sensitive adhesive layer. The trapped gas locally strains the adhesive to form the venting pathways.

Instead of or in addition to curing the pressure sensitive adhesive layer using heat and pressure, the pressure sensitive adhesive layer may include additives, which enable the venting pathways to be formed when the pressure sensitive adhesive layer is strained. For example, fibers may be added to a pressure sensitive adhesive resin that is used to form the pressure sensitive adhesive layer of the laminate stack. The fibers may include continuous fiber(s), chopped fibers, woven fibers, and/or nonwoven fibers to enable and/or facilitate the creation of voids and, thus, venting pathways. Alternatively, particulate may be added to the pressure sensitive adhesive resin, such as, for example, ceramic or clay particles, glass particles, carbon nanotube particles, etc. In other examples, other nonflammable particulate may be used. As the pressure sensitive adhesive layer is strained due to trapped gas, the pressure sensitive adhesive pulls away from the fibers or particulate to create venting pathways through which gas is able to pass.

In some examples, heat and pressure are applied to the laminate stack using hot-press platens. For example, the laminate stack may be pressed between opposing hot-press platens. Alternatively, the laminate stack may be pressed between a hot-press platen and another object such as a non-heated platen. In some examples, the heat and pressure are applied using one hot-press platen and a vacuum bag that fits over the hot-press platen and the laminate stack. In other examples, the heat and pressure are applied to the laminate stack using a heated nip roller, which compresses the laminate stack between a series (e.g., two or more) heated rollers. A removable liner may be applied to a surface of the pressure sensitive adhesive layer prior to processing or curing the laminate stack to maintain a cleanness and tackiness quality of the pressure sensitive adhesive layer.

In some examples, the pressure sensitive adhesive layer may be exposed to localized ultraviolet light. Similar to curing the pressure sensitive adhesive layer using heat and pressure, the ultraviolet light transforms the pressure sensitive adhesive layer such that venting pathways to enable gas to pass through the pressure sensitive adhesive layer are created when the pressure sensitive adhesive layer is strained due to trapped gas. In some examples, the localized exposure to ultraviolet light may be randomly distributed throughout the pressure sensitive adhesive layer.

In some examples, the pressure sensitive adhesive layer may be formed by printing or depositing the pressure sensitive adhesive resin onto a scrim. The pressure sensitive adhesive resin may be deposited randomly on the scrim or may be deposited in a pattern such that pathways are formed in the pressure sensitive adhesive layer to enable any gas that may be trapped between the pressure sensitive adhesive layer and a surface to which the adhesive is coupled to pass through the pressure sensitive adhesive layer.

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via intermediate object(s) (e.g., layer(s)) that are positioned between the first and second objects. Further, as used herein, the terms "apply," "applied," and "application of" also refer to a direct or indirect attachment of one object to another object (e.g., one layer to another layer).

Turning to the figures, FIG. 1 depicts a known example decorative laminate stack 100 including a top sheet 102, an embossing resin 104, a barrier and/or opacity layer 106, a nonwoven permeable layer 108, and an adhesive layer 110. The adhesive layer 110 is operative to couple the laminate stack 100 to a panel surface 112. The example adhesive layer 110 in the known decorative laminate stack 100 does not enable gas to easily pass through the adhesive layer 110 and, thus, bubbles of trapped gas form between the adhesive layer 110 and the panel surface 112.

Figure 2:
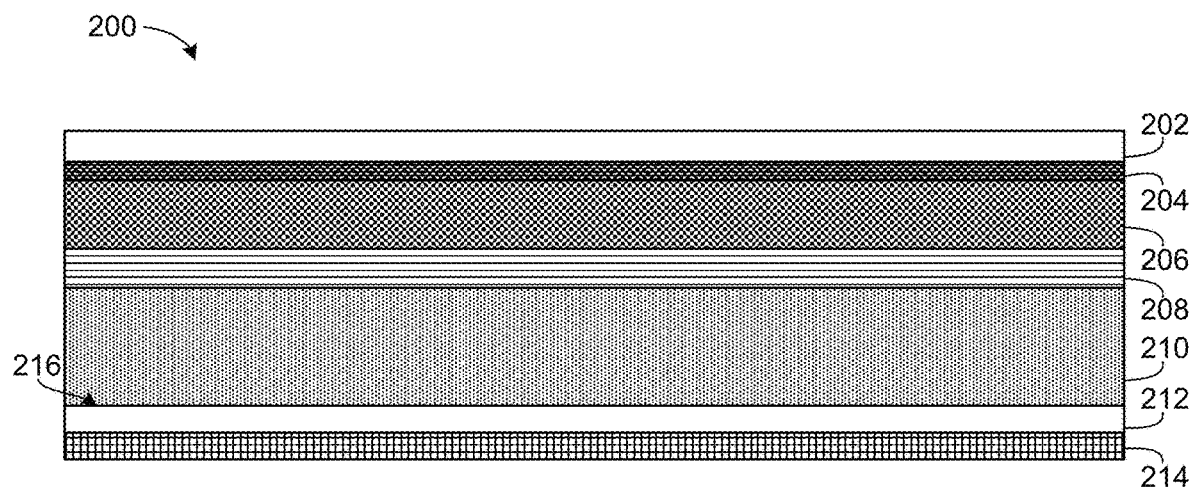
FIG. 2 depicts an example decorative laminate.

FIG. 2 depicts an example laminate stack 200 as described herein. The example laminate stack 200 include a clear cap and/or top sheet layer 202, an ink layer 204, an embossing resin layer 206, a barrier layer 208, a gas permeable nonwoven layer 210, a pressure sensitive adhesive layer 212 and a removable liner 214. The pressure sensitive adhesive layer 212 is applied to the gas permeable nonwoven layer 210 such that an interface 216 is created between a surface of the pressure sensitive adhesive layer 212 facing a surface of the gas permeable nonwoven layer 210.

In some examples, the ink layer 204, the embossing resin layer 206 and the barrier layer 208 may be eliminated from the laminate stack 200. In some examples, the top sheet layer 202 and/or the ink layer 204 may be combined as a decorative construction with a permeable backing. In other examples, additional layers may be included in the example laminate stack 200. The example clear cap and/or top sheet layer 202 may include a transparent thermoplastic polymer. The example ink layer 204 may include an ink composition (e.g., toner). The example embossing resin layer 206 may include a low heat release resin and/or an embossable polymeric material, such as a thermosetting resin. The example barrier layer 208 may include a thermoplastic film. The example gas permeable nonwoven layer 210 may include polyester, such as Reemay®, or felt, such as Nomex® and/or the gas permeable nonwoven layer 210 may include interconnected voids. The example pressure sensitive adhesive layer 212 may include an acrylic type adhesive. Alternatively, the pressure sensitive adhesive layer 212 may include elastomers such as butyl rubber, ethylene-vinyl acetate (EVA), natural rubber, nitriles, silicone rubbers, vinyl ethers, and styrene block copolymers (SBC).

Figure 3:
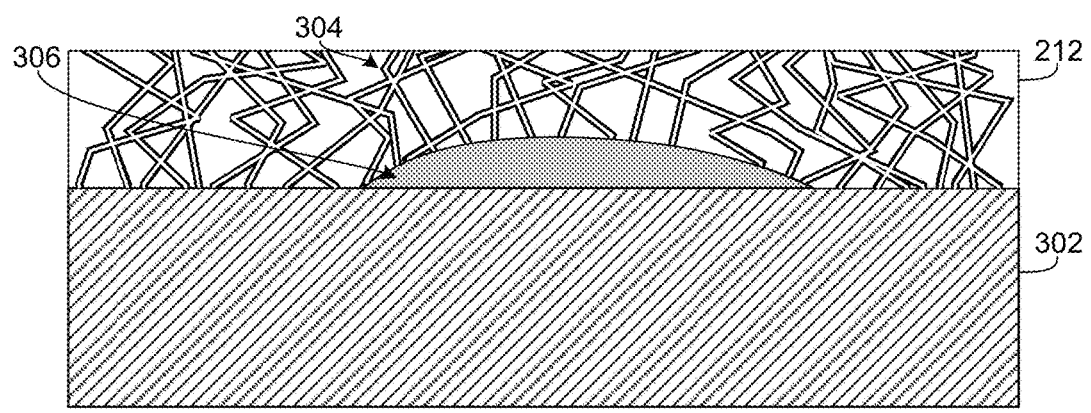
FIG. 3 is a cross-sectional view of an example pressure sensitive adhesive layer of the decorative laminate of FIG. 2

FIG. 3 depicts the example pressure sensitive adhesive layer 212 applied to a surface 302 (e.g., a panel of an aircraft). For purposes of clarity of discussion, other layers of the example laminate stack 200 of FIG. 2 are not shown in FIG. 3. Before the pressure sensitive adhesive layer 212 is applied to the surface 302, the removable liner 214 (FIG. 2) is removed (e.g., by a worker, a service person, etc.). As depicted in FIG. 3, the example pressure sensitive adhesive layer 212 includes venting pathways 304 that are formed in the pressure sensitive adhesive layer 212. The venting pathways 304 may be formed when trapped gas 306 (e.g., air) causes a strain on the pressure sensitive adhesive layer 212. The venting pathways 304 and the resulting intrinsic permeability enable the trapped gas 306 to pass through the pressure sensitive adhesive layer 212 into the gas permeable nonwoven layer 210 (FIG. 2) without creating pockets of trapped gas.

As can also be seen in FIG. 3, the venting pathways 304 are formed by interconnected voids such that multiple different paths are formed through which the gas 306 can pass. The venting pathways 304 may vary in size. However, the venting pathways 304 that enable the gas 306 to pass through the pressure sensitive adhesive layer 212 have a width of at least 50 nanometers. In some examples, the venting pathways 304 are formed randomly throughout the pressure sensitive adhesive layer 212. Alternatively, the venting pathways 304 are formed in a pattern. The venting pathways 304 may be formed in the entire pressure sensitive adhesive layer 212 or may form only at certain locations within the pressure sensitive adhesive layer 212 (e.g., due to localized strain caused by trapped gas 306).

Figure 4:
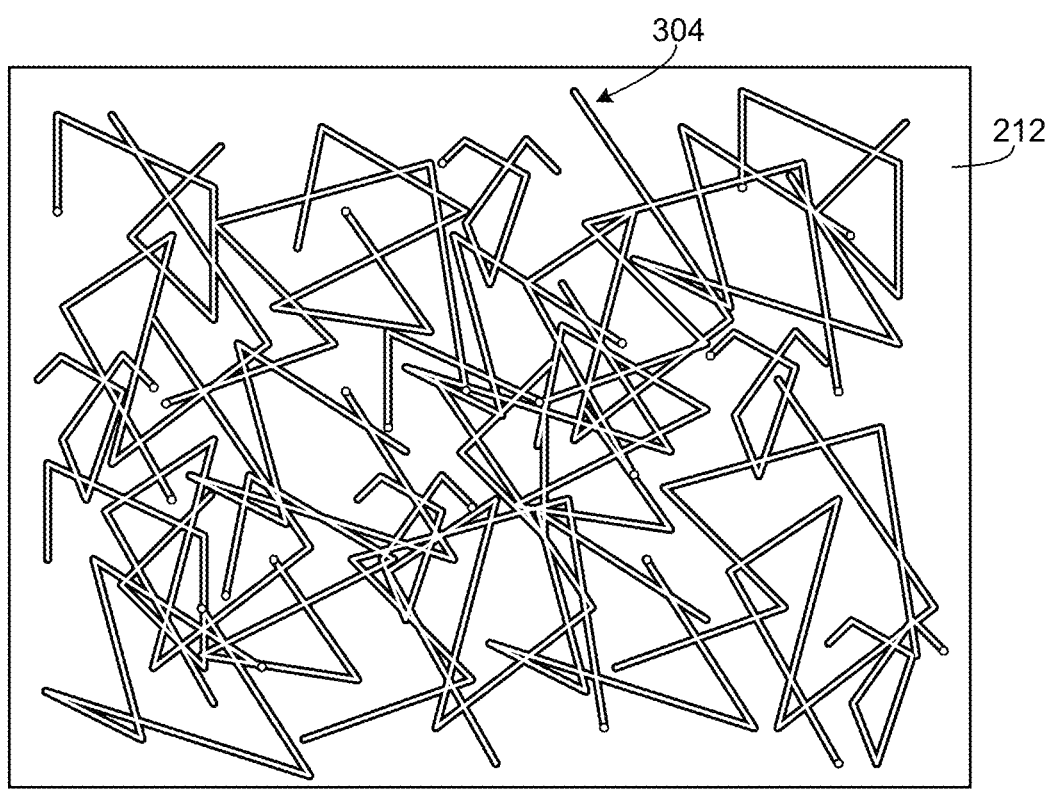
FIG. 4 is a plan view of the example pressure sensitive adhesive layer of FIG. 3.

FIG. 4 depicts a plan view of the example pressure sensitive adhesive layer 212 that is used with the laminate stack 200 described herein. As can be seen in FIG. 4, the venting pathways 304 in the pressure sensitive adhesive layer 212 may be distributed across a width and length of the pressure sensitive adhesive layer 212. Thus, the venting pathways 304 pathways may be distributed in three dimensions throughout a portion of the volume of the pressure sensitive adhesive layer 212 or throughout the entire volume of the pressure sensitive adhesive layer 212.

Figure 5A:
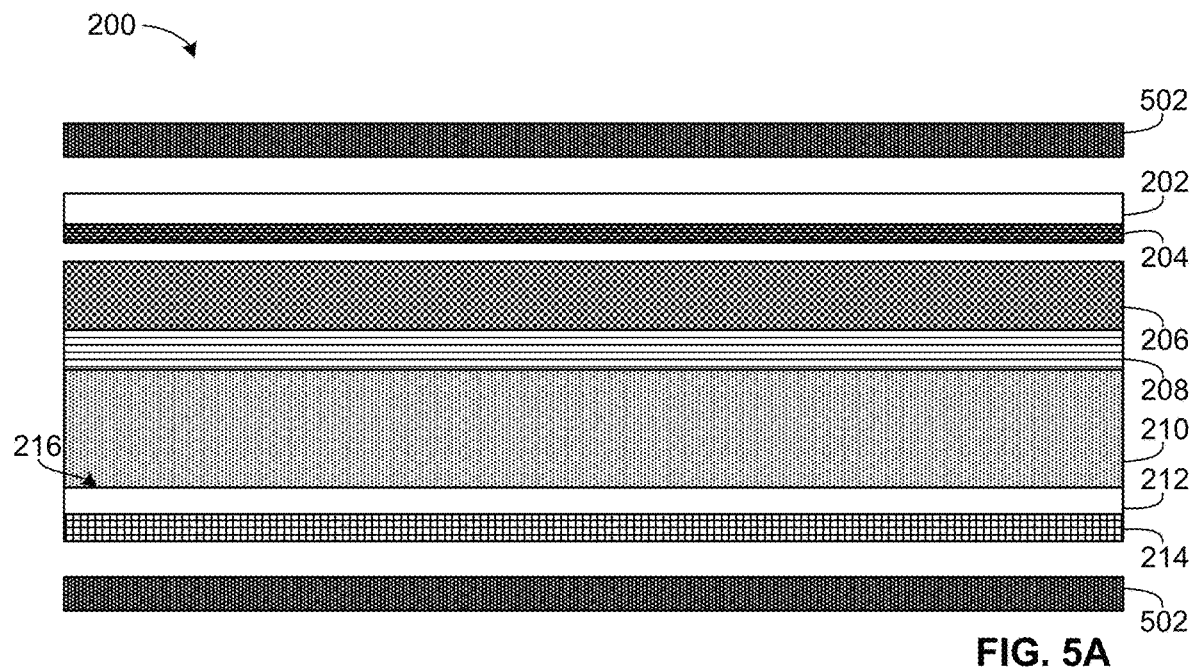
FIGS. 5A and 5B depict an example process that uses hot-press platens to form an example laminate stack.
Figure 5B:
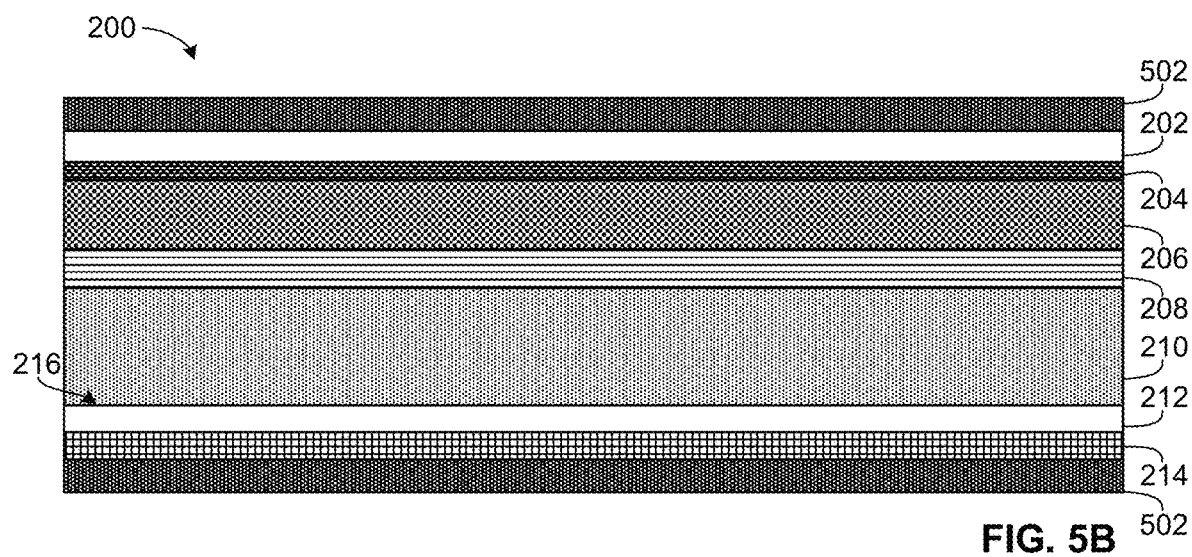

FIGS. 5A and 5B depict an example process that may be used to form an example laminate stack 200 using hot-press platens 502. FIG. 5A depicts the example laminate stack 200 before it is pressed between the two hot-press platens 502 and FIG. 5B depicts the laminate stack 200 being pressed between the two hot-press platens 502. Pressing the laminate stack 200 between two hot-press platens 502 drives a surface of the pressure sensitive adhesive layer 212 into a surface of the gas permeable nonwoven layer 210 facing the surface of the pressure sensitive adhesive layer 212 (e.g., bonds the pressure sensitive adhesive layer 212 to the gas permeable nonwoven layer 210), which forms interconnected hills and valleys on the interface 216 between the gas permeable nonwoven layer 210 and the pressure sensitive adhesive layer 212. The hills and valleys create a non-uniform thickness of the pressure sensitive adhesive layer 212. The venting pathways 304 are more likely to form in locations of the pressure sensitive adhesive layer 212 at which the pressure sensitive adhesive layer 212 is relatively thin.

Additionally, pressing the laminate stack 200 between the two hot-press platens 502 alters the properties of the pressure sensitive adhesive layer 212 of the laminate stack. For example, the combination of heat and pressure decreases the ductility of the pressure sensitive adhesive layer 212 such that the venting pathways 304 are formed when the pressure sensitive adhesive layer 212 is strained (i.e., localized strained due to trapped gas beneath the pressure sensitive adhesive layer 212 upon application to a surface). The venting pathways 304 are formed at locations within the pressure sensitive adhesive layer 212 where the gas 306 is trapped between the pressure sensitive adhesive layer 212 and the bonding surface to which the pressure sensitive adhesive layer 212 is coupled. Processing the pressure sensitive adhesive layer 212 in such a manner does not affect the ability of the pressure sensitive adhesive layer 212 to bond to a surface (e.g., a surface of an aircraft) to which the laminate stack 200 is applied.

The gas permeable nonwoven layer 210 also enables the gas 306 to permeate through the gas permeable nonwoven layer 210 to prevent formation of bubbles under the laminate stack 200. The combination of the pressure sensitive adhesive layer 212 and the gas permeable nonwoven layer 210 prevents bubbles, which can distort an image or lettering printed in the ink layer 204 of the laminate stack 200 from forming under the laminate stack 200.

Figure 6:
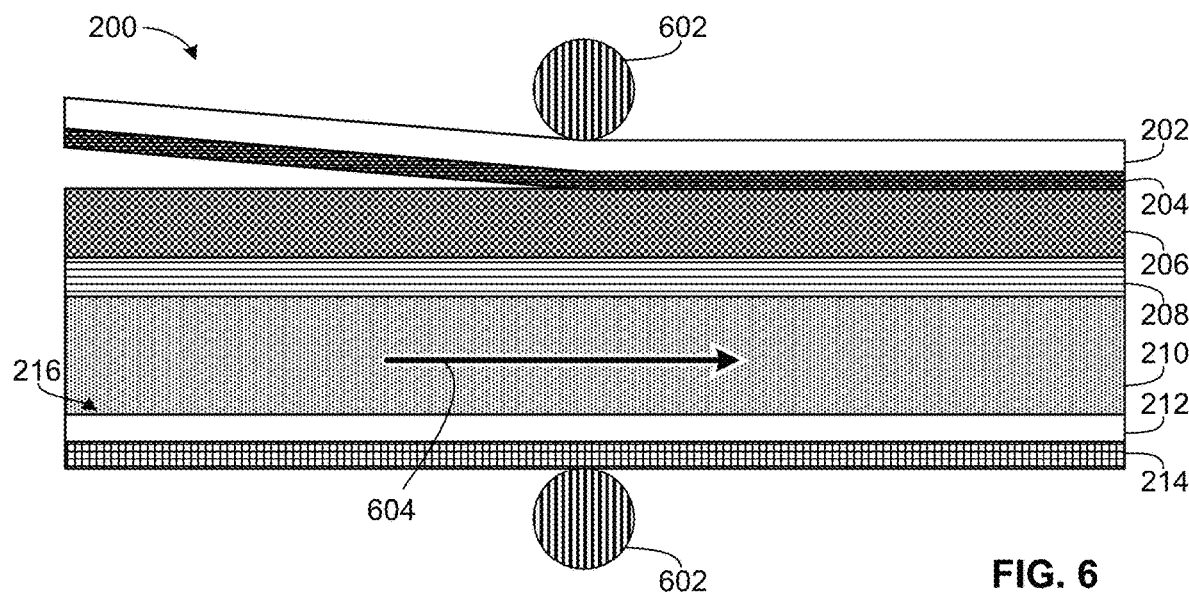
FIG. 6 depicts an example process that uses a heated nip roller to form an example laminate stack.

FIG. 6 depicts an example process that uses a heated nip roller to form the example laminate stack 200. The example heated nip roller includes heated rollers 602 disposed on either side of the laminate stack 200. The laminate stack 200 is fed through the heated nip roller in a direction 604 such that the heated rollers 602 press the layers of the laminate stack 200 together. The heated rollers 602 alter the properties of the pressure sensitive adhesive layer 212 of the laminate stack 200 using a combination of heat and pressure, as described in conjunction with FIGS. 5A and 5B.

Figure 7:
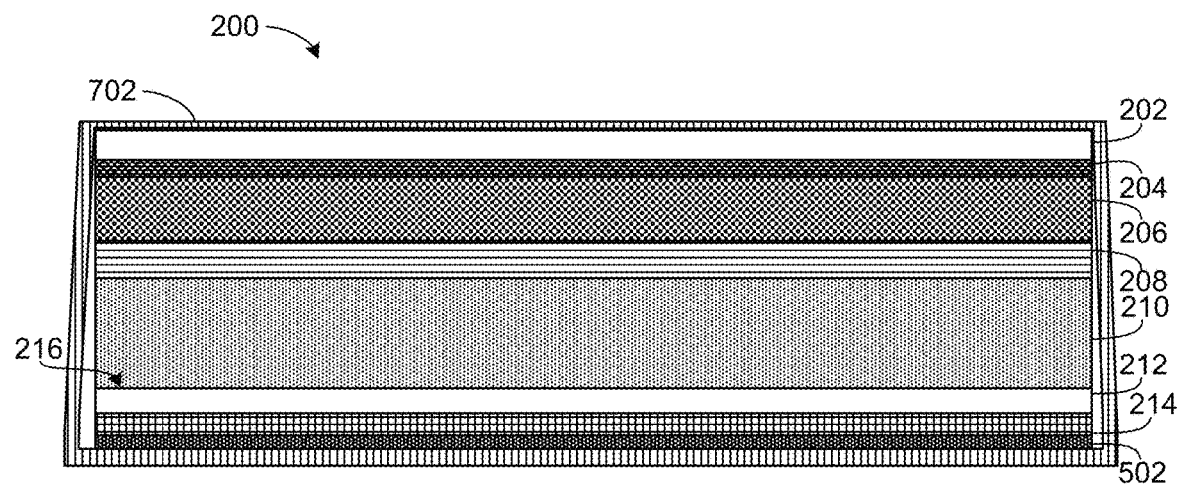
FIG. 7 depicts an example process that uses a vacuum bag and a hot-press platen to form an example laminate stack.

FIG. 7 represents an example process that uses a vacuum bag 702 and the hot-press platen 502 to form the example laminate stack 200. The example hot-press platen 502 provides heat as the vacuum bag 702 provides pressure to process the laminate stack 200 using a combination of heat and pressure. The vacuum bag 702 and hot-press platen 502 alter the properties of the pressure sensitive adhesive layer 212 of the laminate stack 200 using a combination of heat and pressure, as described in conjunction with FIGS. 5A and 5B.

Figure 8:
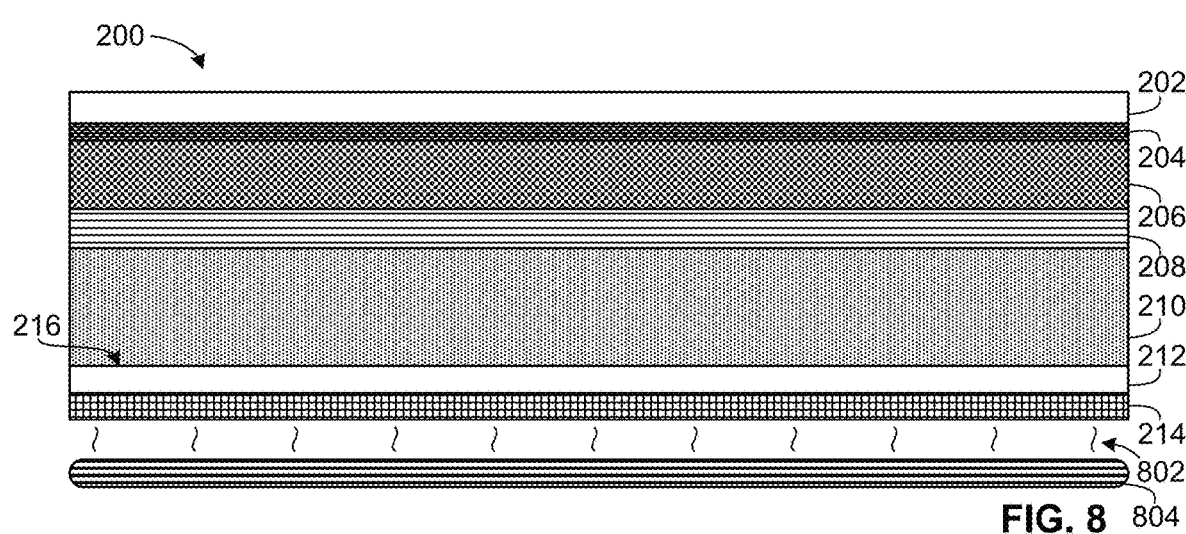
FIG. 8 depicts an example process that uses ultraviolet light to cure or treat an example laminate stack including a pressure sensitive adhesive layer.

FIG. 8 represents an example process that uses ultraviolet light 802 from an ultraviolet light source 804 to cure or treat the example laminate stack 200 including the pressure sensitive adhesive layer 212. The pressure sensitive adhesive layer 212 is exposed to localized ultraviolet light 802. The pressure sensitive adhesive layer 212 may be exposed to the ultraviolet light 802 in particular locations, which may be randomly selected or part of a specified pattern. The ultraviolet light 802 alters the properties of the example pressure sensitive adhesive layer 212 at the exposed locations in a manner similar to the combination of pressure and heat described in conjunction with the examples in FIGS. 5A and 5B.

Figure 9:
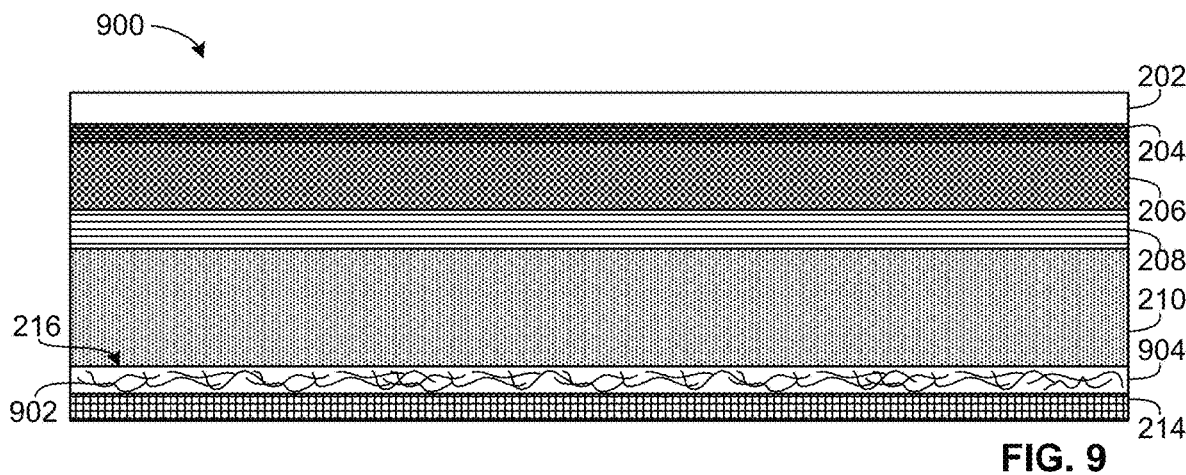
FIG. 9 depicts an example manner of altering a pressure sensitive adhesive resin by adding fibers to the pressure sensitive adhesive resin.

FIG. 9 represents an example manner of altering a pressure sensitive adhesive resin to be used with an example laminate stack 900 that includes adding fibers 902 (e.g., additives) to the pressure sensitive adhesive resin. In the illustrated example of FIG. 6, the fibers 902 may be added to a pressure sensitive adhesive resin prior to the resin being applied to the laminate stack 900 to form the pressure sensitive adhesive layer 904. Alternatively, the fibers 902 are added to the pressure sensitive adhesive layer 904 after the pressure sensitive adhesive resin is applied to the laminate stack 900 and before the pressure sensitive adhesive layer 904 is cured. The fibers 902 may include any nonflammable nonwoven fibers, continuous fiber(s), chopped fibers, woven fibers or nonwoven fibers.

As the laminate stack 900 is applied to a bonding surface (e.g., a panel of an aircraft), any air trapped between the pressure sensitive adhesive layer 904 and the bonding surface causes localized strain on the pressure sensitive adhesive layer 904, which causes the formation of voids adjacent to the fibers 902. The voids are interconnected to form venting pathways 304 to enable the gas 306 to pass through the pressure sensitive adhesive layer 904.

Figure 10:
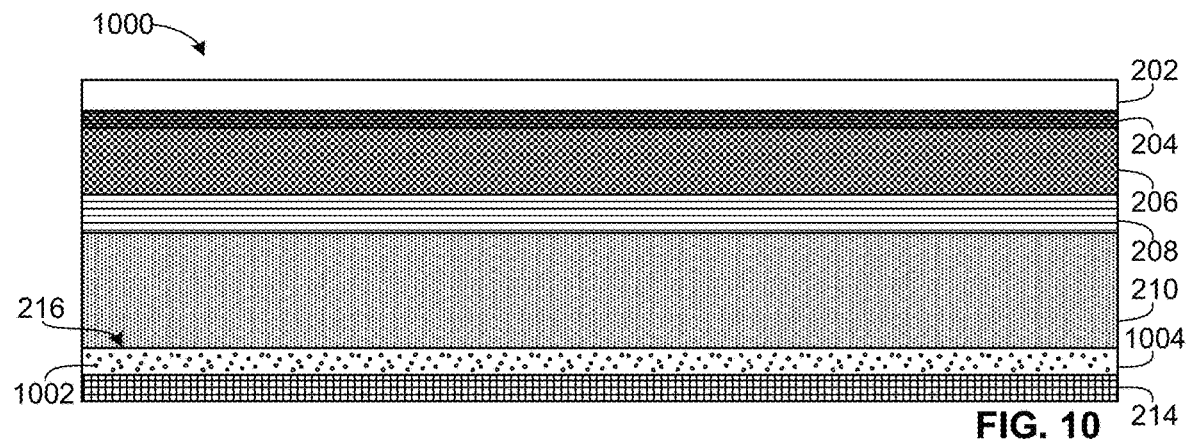
FIG. 10 depicts an example manner of altering a pressure sensitive adhesive resin by adding particulate to the pressure sensitive adhesive resin.

FIG. 10 represents an example manner of altering a pressure sensitive adhesive resin to be used with an example laminate stack 1000 that includes adding particulate 1002 (e.g., additives) to the pressure sensitive adhesive resin. Similar to the fibers 902 described in conjunction with FIG. 9, the particulate 1002 may be added to the pressure sensitive adhesive resin before or after a pressure sensitive adhesive layer 1004 is formed. The particulate 1002 may include particles of glass, ceramic, metal, any other nonflammable particles, or any combination thereof. In some examples, a combination of fibers 902 and particulate 1002 may be used. The particulate 1002 causes formation of venting pathways 304 in the pressure sensitive adhesive layer 1004 similar to the manner in which the fibers 902 cause the formation of venting pathways 304 in the pressure sensitive adhesive layer 904 described above. In some examples, in addition to adding the fibers 902 and/or particulate 1002 to the pressure sensitive adhesive layer 904, 1004, the laminate stack 900, 1000 may also be processed using pressure and heat as described in conjunction with FIGS. 5A-7 or ultraviolet light 802 as described in conjunction with FIG. 8.

Figure 11:
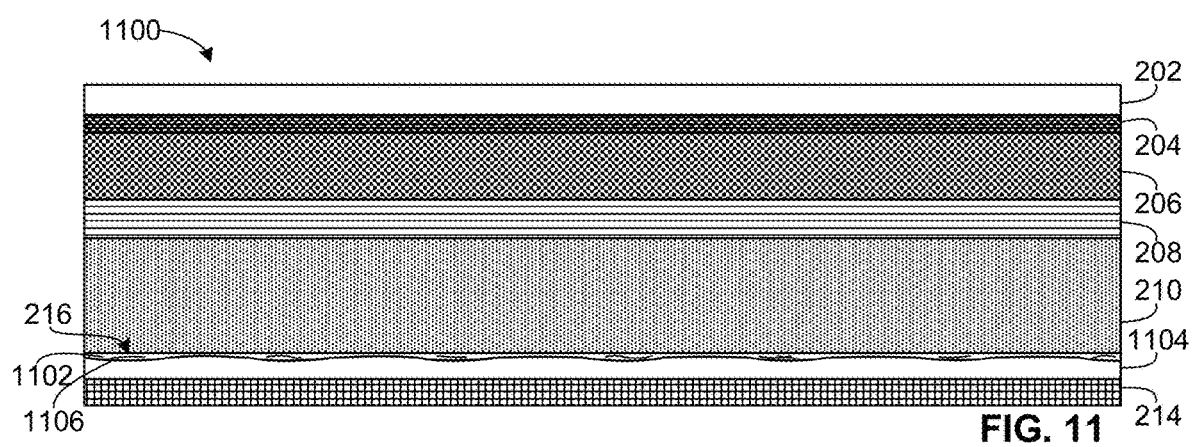
FIG. 11 depicts an example a pressure sensitive adhesive resin deposited on a scrim to form a pressure sensitive adhesive layer.

FIG. 11 represents an example laminate stack 1100 with a pressure sensitive adhesive resin deposited or printed on a scrim 1102 to form a pressure sensitive adhesive layer 1104. The pressure sensitive adhesive resin is deposited (e.g., printed) on a nonwoven fiber scrim 1102 to form hills and valleys in an interface 1106 between the pressure sensitive adhesive layer 1104 and the nonwoven fiber scrim 1102. In some examples, the pressure sensitive adhesive resin is deposited on the nonwoven fiber scrim 1102 in a random manner. In other examples, the pressure sensitive adhesive resin is deposited on the nonwoven fiber scrim 1102 in a specified pattern. The hills and valleys enable interconnected pathways to form on the interface 1106 and in the pressure sensitive adhesive layer 212 to enable gas 306 to pass through the venting pathways 304. The hills and valleys cause some areas of the pressure sensitive adhesive layer 212 to be relatively thin compared to other areas of the pressure sensitive adhesive layer 212. The areas of the pressure sensitive adhesive layer 212 that are relatively thin are more likely to form venting pathways 304 when experiencing strain due to trapped gas 306. In some examples, in addition to depositing the pressure sensitive adhesive layer 1104 on the nonwoven fiber scrim 1102, the laminate stack 1100 may also be processed using the examples described in conjunction with FIGS. 2A-7 above.

Figure 12:
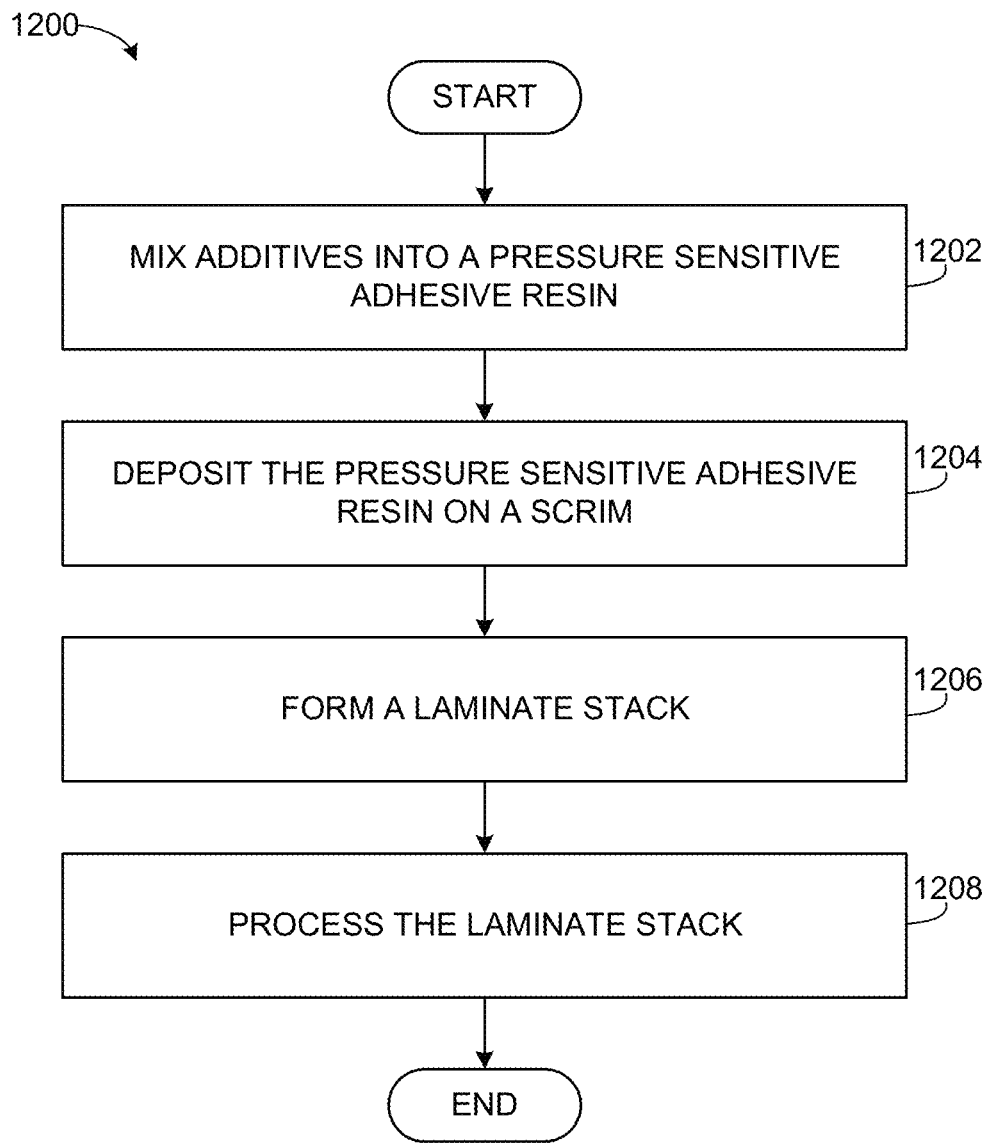
FIGS. 12 and 13 depict example methods that may be implemented with the example laminate stacks described herein.

FIG. 12 depicts a flowchart representing an example method 1200 of forming a laminate stack 200, 900, 1000, and 1100. Although the example method 1200 is described with reference to the flowchart illustrated in FIG. 12, other methods of forming the example laminate stack 200, 900, 1000, and 1100 may alternatively be used. For example, the order of execution of the blocks may be changed, and/or some of the blocks described may be changed, eliminated, or combined. The method of 1200 begins when additives (e.g., fibers 902, particulate 1002) are mixed into a pressure sensitive adhesive resin that may be used to form a pressure sensitive adhesive layer 904 and 1004 (block 1202). In some examples, this step may be eliminated and additives 902 and 904 are not added to the pressure sensitive adhesive layer 212 and 1104. In some examples, the pressure sensitive adhesive resin is deposited on a scrim 1102 to form the pressure sensitive adhesive layer 1104 (block 1204). The pressure sensitive adhesive resin may be printed on the scrim 1102 such that venting pathways 304 will form in a pattern or randomly. After the pressure sensitive adhesive layer 1104 is formed on the scrim 1102, the laminate stack 1100 is formed including the pressure sensitive adhesive layer 1104. (block 1206). Alternatively, the pressure sensitive adhesive resin is not deposited on a scrim 1102, and an example laminate 200, 900, and 1000 stack is formed using the example pressure sensitive adhesive layer 212, 904, and 1004 (block 1206). In some examples, the laminate stack 200, 900, 1000, and 1100 may include additional layers including an ink layer 204, an embossing resin layer 206 and a barrier layer 208. The example laminate stack 200, 900, 1000, and 1100 is processed using a combination of heat and pressure or ultraviolet light 802 (block 1208). For example, heat and pressure may be applied using hot-press platens 502, heated rollers 602, or a vacuum bag 702 and a hot-press platen 502. Processing the laminate stack 200, 900, 1000, and 1100 using a combination of heat and pressure modifies the properties of the pressure sensitive adhesive layer 212 such that the venting pathways 304 are formed when the pressure sensitive adhesive layer 212 is strained. In some examples where additives 902, 1002 are added in block 1202 or where the pressure sensitive adhesive resin is printed on a scrim 1102 in block 1204, the pressure sensitive adhesive layer 904, 1004, and 1104 may not be processed using a combination of heat and pressure in block 1208.

Figure 13:
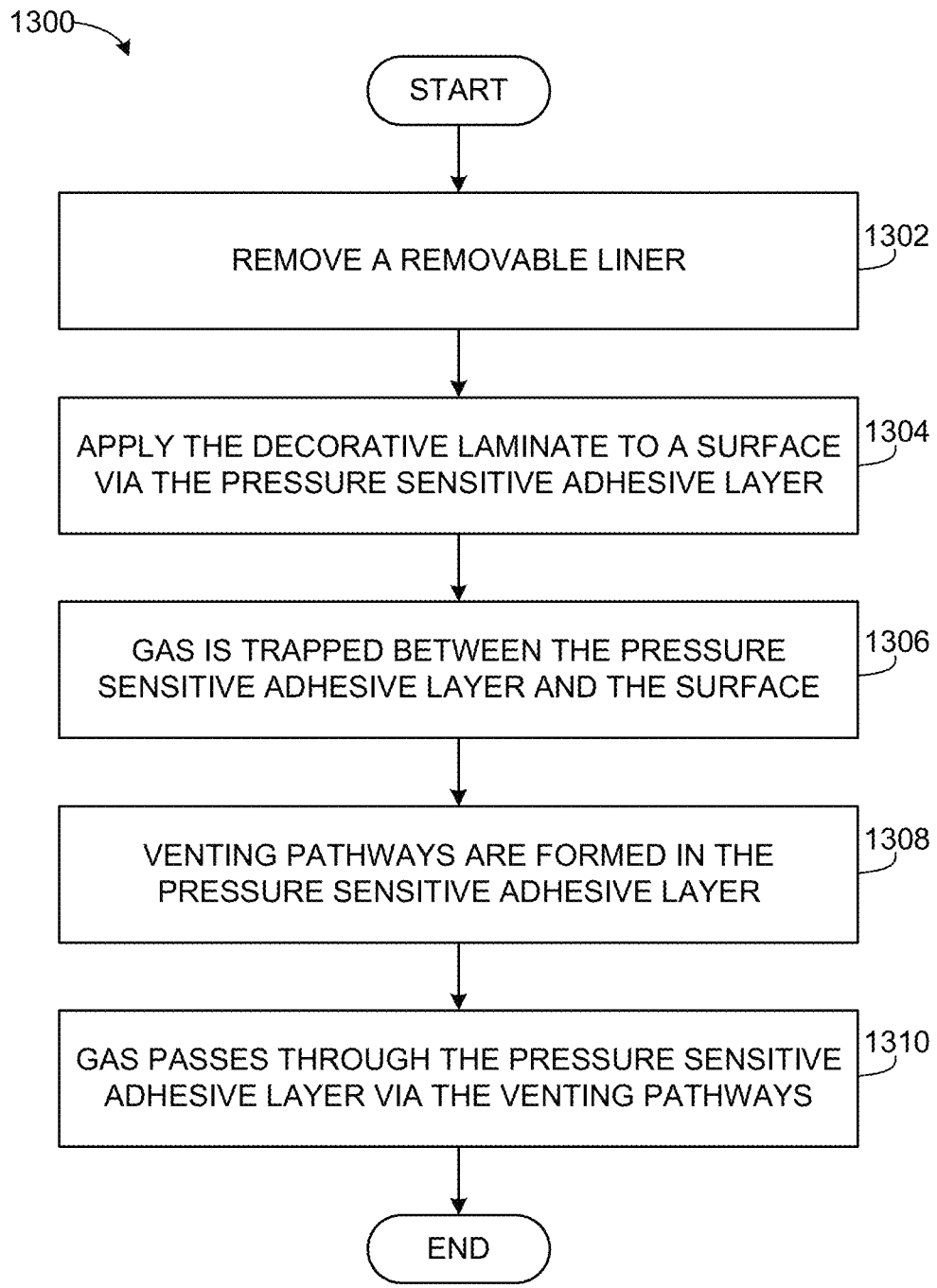

FIG. 13 depicts a flowchart representing an example method 1300 of applying the laminate stack 200, 900, 1000, and 1100 to the surface 302 (e.g., a surface of an aircraft). In some examples, a service person removes an existing laminate from the surface 302 prior to applying the laminate stack 200, 900, 1000, and 1100 to the surface 302. The method 1300 begins when the removable liner 214 is removed from the laminate stack 200, 900, 1000, and 1100 (block 1302). The decorative laminate is then applied to the surface 302 using the pressure sensitive adhesive layer 212, 904, 1004, and 1104 (block 1304). Gas 306 may become trapped between the pressure sensitive adhesive layer 212, 904, 1004, and 1104 and the surface 302 (block 1306). The pressure sensitive adhesive layer 212, 904, 1004, and 1104 may be locally strained where gas 306 is trapped and the venting pathways 304 are formed in the pressure sensitive adhesive layer 212, 904, 1004, and 1104 (block 1308). The trapped gas 306 passes through the pressure sensitive adhesive layer 212, 904, 1004, and 1104 via the venting pathways 304 formed in the pressure sensitive adhesive layer 212, 904, 1004, and 1104 (block 1310).

From the foregoing, it will appreciated that the above disclosed methods, apparatus and articles of manufacture enable gases to pass through a pressure sensitive adhesive layer of a laminate stack of a decorative laminate to prevent formation of bubbles that may distort the image(s) or lettering on the decorative laminate.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A method comprising:
   forming a laminate stack including a gas permeable nonwoven layer and a pressure sensitive adhesive layer, the pressure sensitive adhesive layer having a first surface and a second surface located opposite the first surface, the first surface contacting the gas permeable nonwoven layer; and
   processing the laminate stack by reducing a ductility of the pressure sensitive adhesive layer such that venting pathways are formed in the pressure sensitive adhesive layer in response to a mechanical strain applied to the pressure sensitive adhesive layer via a trapped gas, the venting pathways extending through a thickness of the pressure sensitive adhesive layer to enable the trapped gas to pass through the pressure sensitive adhesive layer from the second surface to the first surface.

2. The method as defined in claim 1, wherein the venting pathways are formed in a volume of the pressure sensitive adhesive layer that is local to the trapped gas.

3. The method as defined in claim 1, further comprising forming the pressure sensitive adhesive layer by depositing a pressure sensitive adhesive resin on a nonwoven fiber scrim.

4. The method as defined in claim 3, wherein the pressure sensitive adhesive resin is deposited on the nonwoven fiber scrim in a random manner.

5. The method as defined in claim 3, wherein the pressure sensitive adhesive resin is deposited on the nonwoven fiber scrim in a specified pattern.

6. The method as defined in claim 1, wherein processing the laminate stack includes applying pressure and heat to the laminate stack.

7. The method as defined in claim 6, wherein the pressure and the heat bond the pressure sensitive adhesive layer to the gas permeable nonwoven layer.

8. The method as defined in claim 6, wherein applying the pressure and the heat to the laminate stack includes clamping the laminate stack between hot-press platens to reduce the ductility of the pressure sensitive adhesive layer.

9. The method as defined in claim 6, wherein applying the pressure and heat includes disposing the laminate stack between rollers of a heated nip roller to reduce the ductility of the pressure sensitive adhesive layer.

10. The method as defined in claim 6, wherein applying the pressure and heat includes disposing the laminate stack between a vacuum bag and a heated platen to reduce the ductility of the pressure sensitive adhesive layer.

11. The method as defined in claim 1, further comprising mixing an additive into a pressure sensitive adhesive resin that is used to form the pressure sensitive adhesive layer of the laminate stack.

12. The method as defined in claim 1, wherein processing the laminate stack includes exposing the pressure sensitive adhesive layer to localized ultraviolet light.

13. An apparatus comprising:
a laminate stack for a decorative laminate, the laminate stack including a gas permeable nonwoven layer and a pressure sensitive adhesive layer, the pressure sensitive adhesive layer having a first surface and a second surface located opposite the first surface, the first surface contacting the gas permeable nonwoven layer, the laminate stack configured such that venting pathways are formed in the pressure sensitive adhesive layer in response to a mechanical strain applied to the pressure sensitive adhesive layer via a trapped gas, the venting pathways extending through a thickness of the pressure sensitive adhesive layer to enable the trapped gas to pass through the pressure sensitive adhesive layer from the second surface to the first surface.

14. The apparatus as defined in claim 13, wherein the pressure sensitive adhesive layer includes fibers, the venting pathways formed in the pressure sensitive adhesive layer adjacent the fibers.

15. The apparatus as defined in claim 13, wherein the pressure sensitive adhesive layer includes particulate, the venting pathways formed in the pressure sensitive adhesive layer adjacent the particulate.

16. The apparatus as defined in claim 13, wherein the pressure sensitive adhesive layer includes a pressure sensitive adhesive resin deposited on a nonwoven fiber scrim.

17. A method comprising:
applying a decorative laminate to a panel surface, the decorative laminate including a gas permeable nonwoven layer and a pressure sensitive adhesive layer, the pressure sensitive adhesive layer having a first surface and a second surface located opposite the first surface, the first surface contacting the gas permeable nonwoven layer, the second surface contacting the panel surface in response to the decorative laminate being applied to the panel surface;
trapping gas between the second surface of the pressure sensitive adhesive layer and the panel surface; and
forming venting pathways in the pressure sensitive adhesive layer in response to a mechanical strain applied to the pressure sensitive adhesive layer via the trapped gas, the venting pathways extending through a thickness of the pressure sensitive adhesive layer to enable the trapped gas to pass through the pressure sensitive adhesive layer from the second surface to the first surface.

18. The method as defined in claim 17, wherein the venting pathways are formed in a volume of the pressure sensitive adhesive layer that is local to the trapped gas.

19. The method as defined in claim 17, wherein the pressure sensitive adhesive layer includes fibers, and wherein the venting pathways are formed in the pressure sensitive adhesive layer adjacent the fibers.

20. The method as defined in claim 17, wherein the pressure sensitive adhesive layer includes particulate, and wherein the venting pathways are formed in the pressure sensitive adhesive layer adjacent the particulate.

\* \* \* \* \*